United States Patent
Ikemoto et al.

(12)

(10) Patent No.: US 6,662,936 B2
(45) Date of Patent: Dec. 16, 2003

(54) BAG CONVEYING APPARATUS AND A GRIPPER ENDLESS CHAIN USED IN A BAG FILLING PACKAGING MACHINE

(75) Inventors: Iwao Ikemoto, Iwakuni (JP); Shoichi Koga, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 23 days.

(21) Appl. No.: 10/115,509

(22) Filed: Apr. 2, 2002

(65) Prior Publication Data

US 2002/0144880 A1 Oct. 10, 2002

(30) Foreign Application Priority Data

Apr. 4, 2001 (JP) ........................................ 2001-106529

(51) Int. Cl.[7] .............................................. B65G 47/86
(52) U.S. Cl. .................... 198/803.7; 53/284.7; 141/166
(58) Field of Search ........................... 198/470.1, 803.7; 53/459, 464, 570, 284.7, 384.1, 385.1; 141/166, 314

(56) References Cited

U.S. PATENT DOCUMENTS 2,649,673 A  * 8/1953  Bartelt ..................... 53/562
2,697,507 A  * 12/1954 Vergobbi .................... 53/242

FOREIGN PATENT DOCUMENTS

| DE | 39 04 818 | 9/1989 |
| EP | 1 081 078 | 3/2001 |
| JP | 56-48363  | 11/1981 |
| JP | 59-221201 | 12/1984 |
| JP | 05 097302 | 4/1993 |

* cited by examiner

Primary Examiner—Joseph E. Valenza
(74) Attorney, Agent, or Firm—Koda & Androlia

(57) ABSTRACT

A bag conveying apparatus including a sprocket continuously rotated on a horizontal plane, a fixed guide member having a guide section of a semicircular shape, and an endless chain mounted between the sprocket and the guide section of the guide member. The endless chain is comprised of a plurality of links connected by connecting shafts. Guide rollers rotatable about their own vertical axes are disposed on and under each connecting shaft, and an inside guide roller rotatable about its own horizontal axis is disposed on the inner side of each link. The guide section of the guide member has roller guide sections that contact the guide rollers of the endless chain, and the guide section also has a guide groove in which the inside guide rollers of the endless chain are fitted. Grippers that grip both edges of a bag are installed on each link.

9 Claims, 19 Drawing Sheets

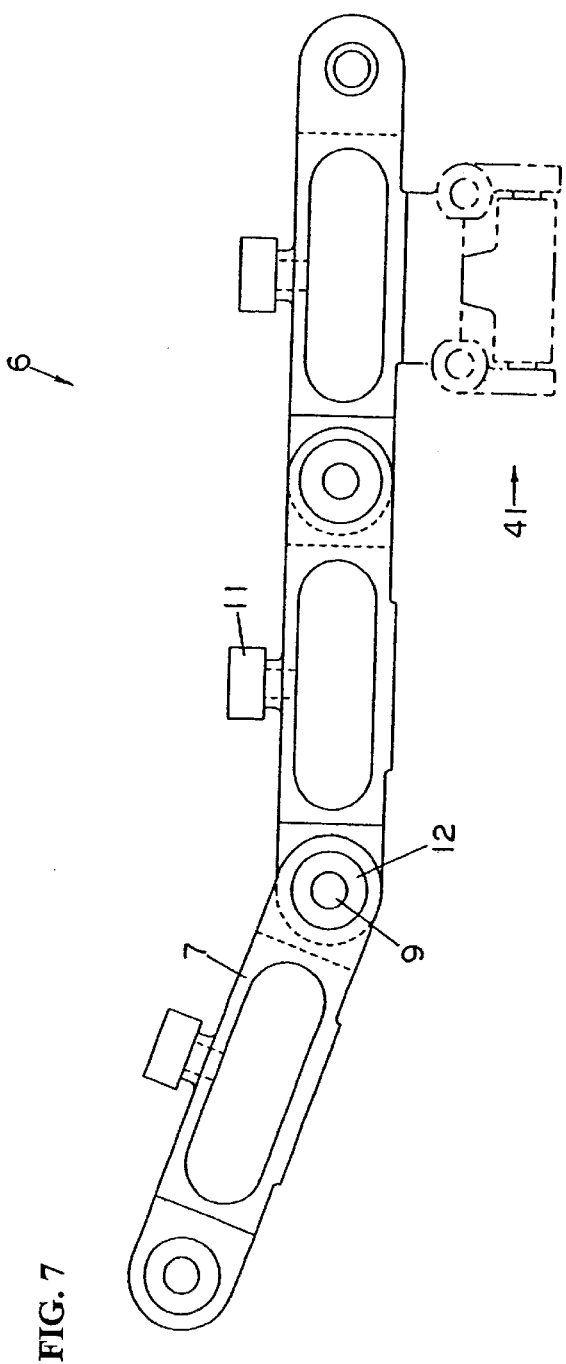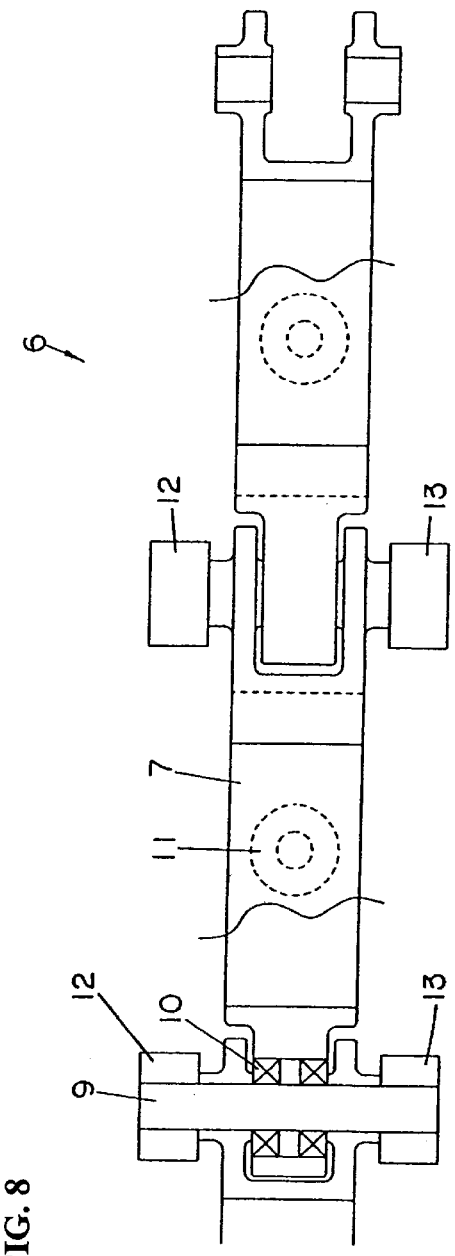
FIG. 7
FIG. 8

BAG CONVEYING APPARATUS AND A GRIPPER ENDLESS CHAIN USED IN A BAG FILLING PACKAGING MACHINE

BACKGROUND OF THE INVENTION

1. Field of the Invention

The present invention relates to a bag conveying apparatus used in a bag filling packaging machine in which bags (with the bag mouths facing upward) with both edges thereof being gripped by grippers are conveyed continuously or intermittently along an annular path.

2. Prior Art

In a typical bag filling packaging machine, both edges of bags are gripped by gripper pairs, and such bags are conveyed continuously or intermittently along an annular path and respective packaging treatments such as opening, filling with contents and sealing, etc. are successively performed on the bags.

One type of bag conveying apparatus used in such a bag filling packaging machine includes a plurality of sprockets (driving sprocket(s) and driven sprocket(s)) and an endless chain. Sprockets are disposed in specified positions on a horizontal plane, and the endless chain is provided between the sprockets. The endless chain has a plurality of gripper pairs that are installed at equal intervals so as to grip the bags. The driving sprocket(s) are continuously or intermittently rotated, and the bags gripped by the gripper pairs are continuously or intermittently conveyed along a predetermined annular path.

In the bag conveying apparatus described in Japanese Patent Application Laid-Open (Kokai) No. S59-221201, two sprockets are installed, and an endless chain is provided between these sprockets. In the bag conveying apparatus disclosed in Japanese Patent Application Publication (Kokoku) No. S56-48363, an endless chain is provided between four sprockets.

The conveying apparatus with two sprockets has a simpler structure than four-sprocket conveying apparatuses and has a better cleaning and maintenance characteristics. Also, it can keep the cost low.

However, in either type, a driven sprocket(s) must be provided for mounting the endless chain, and further simplification of the structure and reduction of the cost are not considered feasible.

Meanwhile, various packaging devices are disposed in a bag filling packaging machine. In order to make the bag filling packaging machine as a whole more compact, it is desirable that most of these devices be installed in upright positions inside the track of the endless chain. However, even inside the track, space cannot be found for the upright installation of the packaging treatment devices in the sprocket installation areas and surrounding areas (because of the need to prevent interference with the rotating sprockets). Accordingly, a corresponding amount of space is required on the outside of the track, and thus further reduction in the size of the bag filling packaging machine is hindered.

Furthermore, the weight of the gripper pairs, the weight of the filled bags and the impact during filling are loaded on the endless chain of the bag conveying apparatus. Accordingly, in order to withstand these weights and impacts, and in order to allow a secure and stable packaging processing, it is necessary that the gripper pairs be operated stably and with good precision over a long period of time. However, this requirement has not been sufficiently satisfied by conventional bag conveying apparatuses (especially chain type apparatuses that are mainly commercially marketed devices). As a result, such bag conveying apparatuses require frequent maintenance and parts replacement.

SUMMARY OF THE INVENTION

Accordingly, the present invention is to solve the problems with the prior art bag conveying apparatus; and it is an object of the present invention to provide a simple and low cost bag conveying apparatus that can reduce the size of bag filling packaging machines.

It is another object of the present invention to provide a bag conveying apparatus for packaging process machines in which the gripper pairs that hold bags are rotated in a stable fashion and with good precision over a long period of time.

The above objects are accomplished by a unique structure for a bag conveying apparatus used in a bag filling packaging machine, wherein the bag conveying apparatus is comprised of:

- a sprocket connected to a driving means and rotated continuously or intermittently on a horizontal plane,
- a fixed guide member which has a guide section that has a substantially semicircular shape when viewed from above, the fixed guide member being disposed on substantially the same horizontal plane as the sprocket with a specified spacing in between, and
- an endless chain provided between the sprocket and the guide section of the fixed guide member, and
- a plurality of gripper pairs installed at equal intervals on the endless chain, the plurality of gripper pairs being for griping both edges of a bag.

In this structure, the sprocket is provided at a predetermined position, and the guide section of the fixed guide member is provided so as to be movable toward and away from said sprocket (in a horizontal direction) and is constantly urged in a direction opposite from the sprocket.

Furthermore, in the present invention, the endless chain is comprised of a plurality of links that are connected via connecting shafts; guide rollers which are rotatable about their own vertical axes are disposed on each one of the connecting shafts; an inside guide roller which is rotatable about its own horizontal axis is disposed on an inside of each one of the links; and the guide section of the fixed guide member is provided with a roller guide section and a guide groove, so that the guide rollers of the endless chain contact the roller guide, and the inside guide roller of the endless chain fits in the guide groove.

In addition, the sprocket is provided on an outer circumferential surface thereof with recessed portions at equal intervals, so that the guide rollers of the endless chain engage with the recessed portions; and the sprocket is further provided with a supporting groove, so that the inside guide roller of the endless chain fits in the supporting groove.

The above objects are accomplished also by a unique structure for a gripper endless chain that comprises a plurality of links connected via connecting shafts in an endless configuration, and a plurality of gripper pairs that grip both edges of a bag are disposed at equal intervals on the chain; and in this gripper chain, upper and lower rollers are disposed respectively on and under each of the connecting shafts so that the rollers are rotatable about their own vertical axes; and an inside roller is disposed on an inside of each of the links so that the inside roller is rotatable about its own horizontal axis.

In this structure, at least one of the plurality of gripper pairs is provided on each one of the links; and each of the links is formed with covering portions on both ends of an outer circumferential side thereof so as to cover the connecting portions of each one of the links.

BRIEF DESCRIPTION OF THE DRAWINGS

FIG. 7 is a top view of a part of the endless chain;

FIG. 8 is a front view (partially in section) of the endless chain;

DETAILED DESCRIPTION OF THE INVENTION

The bag conveying apparatus for a bag filling packaging machine according to the present invention will be described below with reference to FIGS. 1 through 20.

Figure 1:
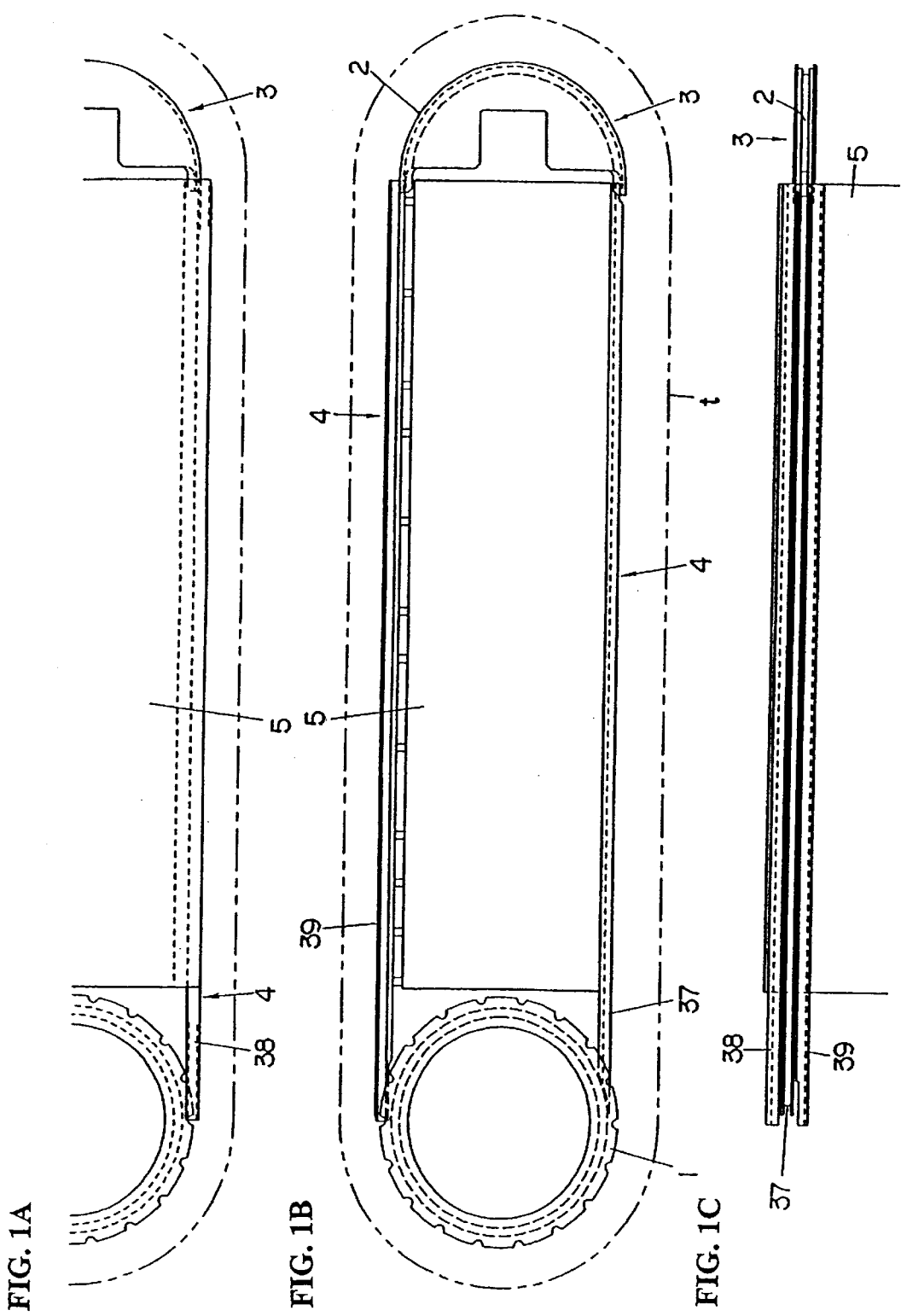
FIG. 1A is a half top view of the sprocket, fixed guide member and rectilinear guide members of the bag conveying apparatus according to the present invention.
FIG. 1B is a top view of the sprocket, fixed guide member and rectilinear guide members shown in cross section.
FIG. 1C is a front view of the sprocket, fixed guide member and rectilinear guide members.

As shown in FIG. 1, the bag conveying apparatus is substantially comprised of a sprocket 1, a fixed guide member 3, an endless chain (described below), and rectilinear guide members 4.

The sprocket 1 is connected to a driving means (not shown), and it rotates continuously on a horizontal plane. The fixed guide member 3 has a guide section 2 that is disposed on the same horizontal plane as the sprocket 1. The guide section 2 has a substantially semicircular shape when viewed from above as best seen from FIGS. 1 and 2. The endless chain is mounted between the sprocket 1 and the guide section 2 of the fixed guide member 3. The rectilinear guide members 4 are provided between the sprocket 1 and guide section 2 so as to guide the endless chain on rectilinear tracks between the sprocket 1 and guide section 2.

A plurality of gripper pairs (described below) which grip both edges of each one of bags are installed at equal intervals on the endless chain, so that the bags are conveyed at a constant speed along a conveying track t.

Furthermore, a sub-base 5 is disposed inside the track t of the endless chain. The fixed guide member 3, rectilinear guide members 4 and various packaging devices are installed on the upper and side portions of this sub-base 5.

As seen from FIGS. 7 and 8, the endless chain 6 is comprised of a plurality of links 7 that are connected in an endless configuration via connecting shafts 9. Each of these connecting shafts 9 is fastened to one end of one link 7 and is supported via a bearing 10 on another end of the adjacent link 7 in a manner that the connecting shaft 9 is rotatable. As will be described later, one gripper pair is installed on each link 7.

Furthermore, an inside guide roller 11 is disposed on the central portion of the inner side of each link 7 so that the inside guide roller 11 is rotatable on a vertical plane or about its own horizontal axis. Also, an upper guide roller 12 and lower guide roller 13 are respectively disposed on and under each connecting shaft 9 so that each of these guide rollers 12 and 13 is rotatable on the horizontal plane or about its own vertical axis.

Figure 2:
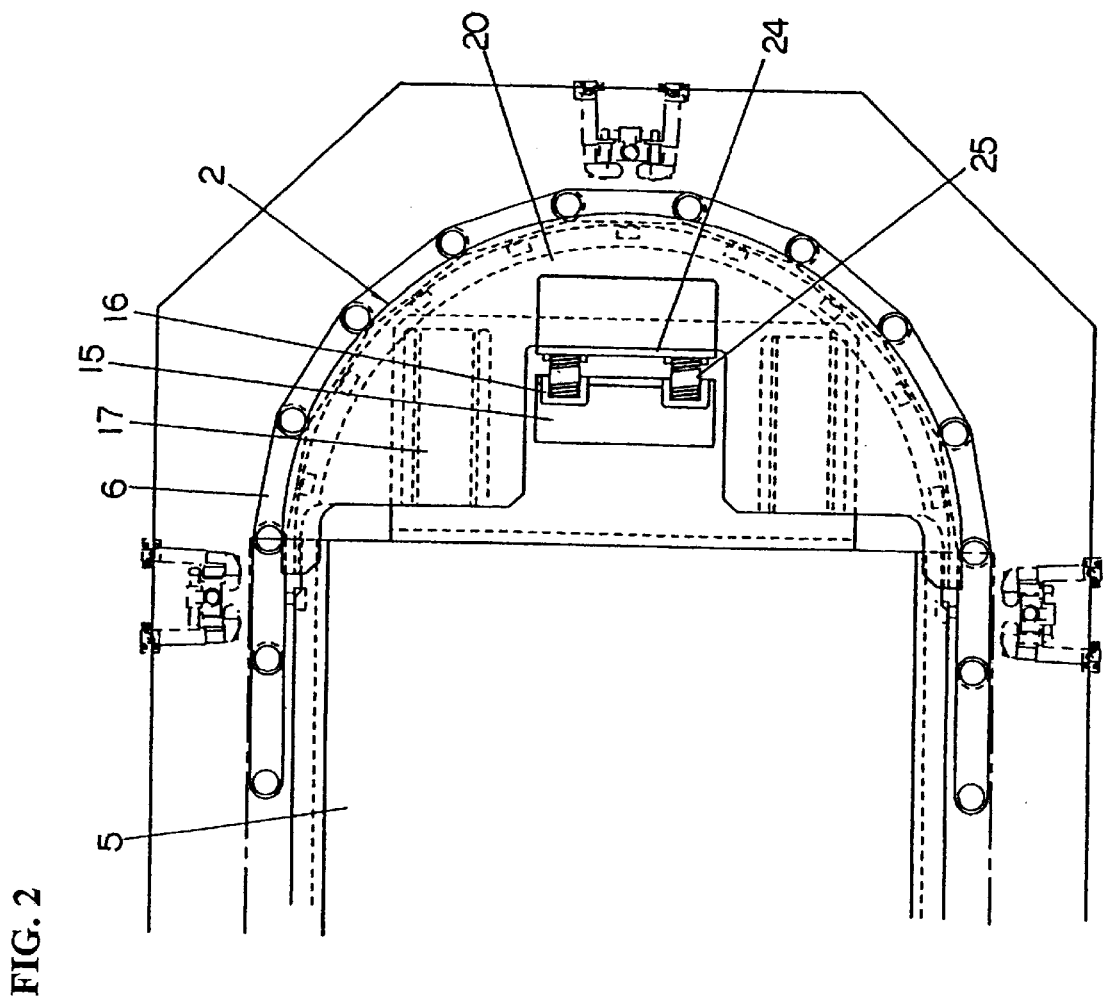
FIG. 2 is a top view of the fixed guide member.
Figure 3:
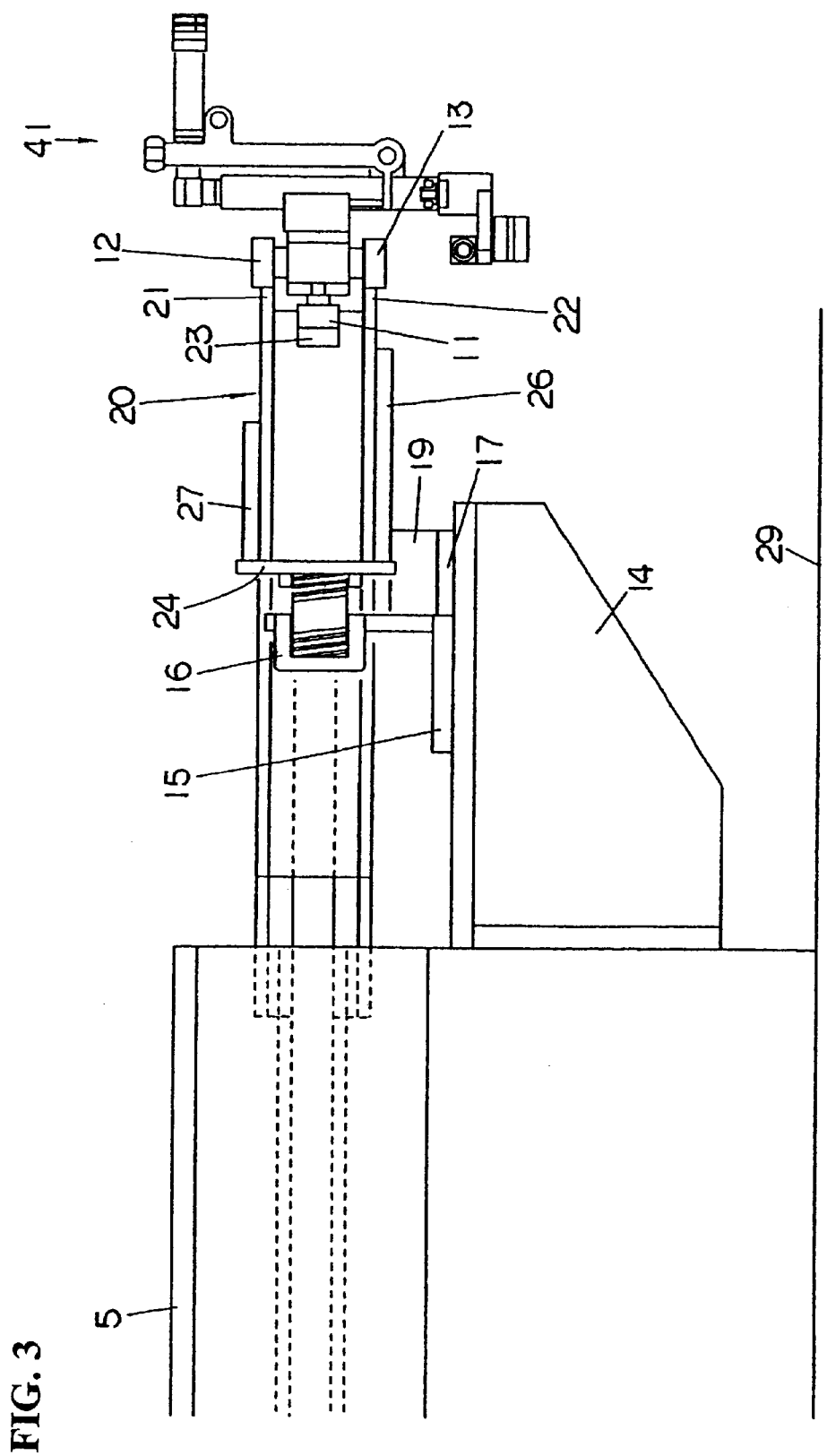
FIG. 3 is a sectional front view thereof.
Figure 4:
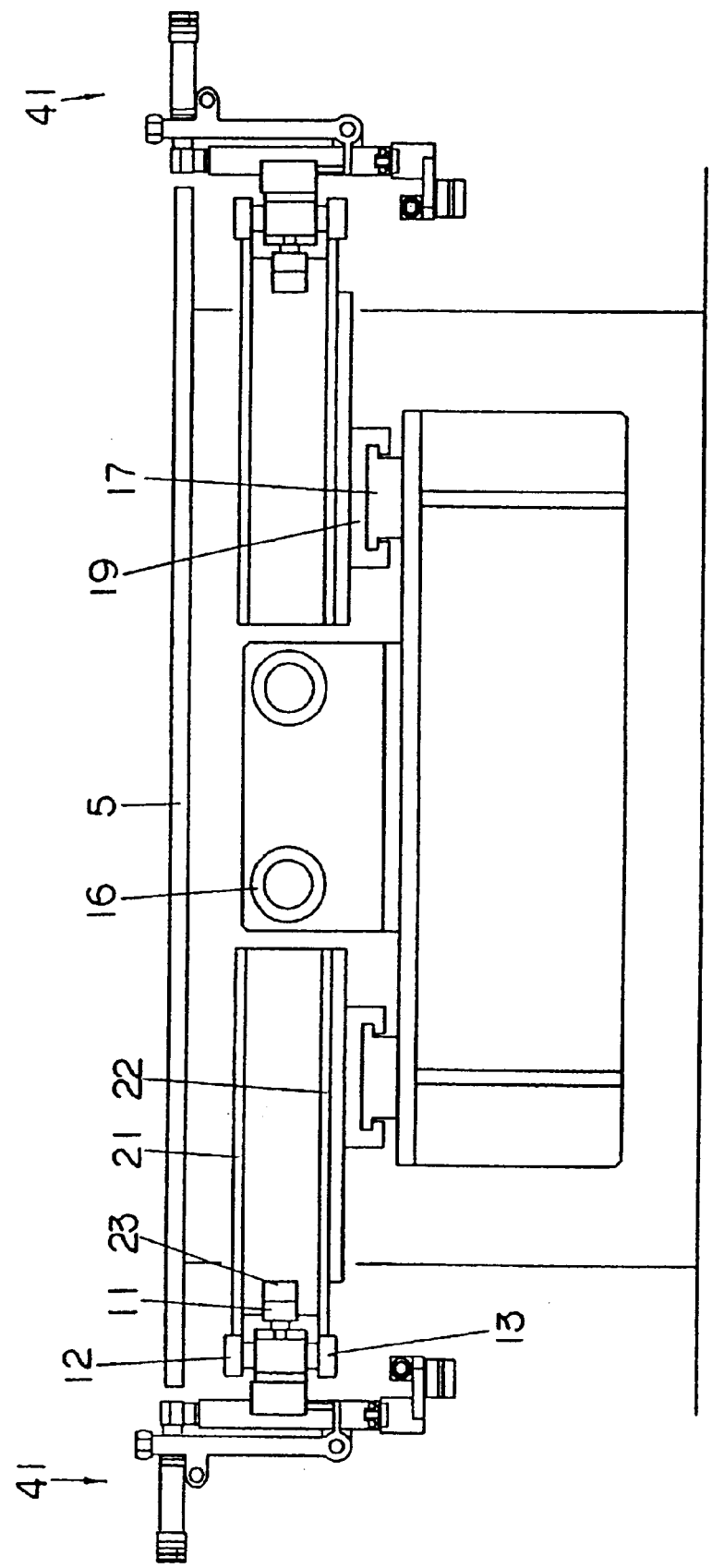
FIG. 4 is a sectional side view thereof.

As seen from FIGS. 2 through 4, the fixed guide member 3 is disposed on a bracket 14 at an end portion of the sub-base 5. The fixed guide member 3 includes, among others (not shown), a spring supporting member 16, a pair of slide rails 17, a slide member 19 and a guide plate 20. The spring supporting member 16 is provided on the bracket 14 via an attachment element 15, and the pair of slide rails 17 are likewise provided on the bracket 14. The slide member 19 is installed so as to be free to slide over the slide rails 17, and the guide plate 20 is provided on the slide member 19.

The guide section 2 is formed on the outer circumference of the substantially semicircular guide plate 20. This guide section 2 includes a flange-form upper roller guide section 21 and lower roller guide section 22, and it also includes a guide groove 23. The upper guide rollers 12 and lower guide rollers 13 of the endless chain 6 respectively come into contact with the upper roller guide section 21 and lower roller guide section 22. The guide groove 23 is disposed between the upper and roller guide sections 21 and 22, and the inside guide rollers 11 of the endless chain 6 are fitted in this guide groove 23.

Furthermore, a spring receiving member 24 is fastened to the inside recess in the guide plate 20, and compression springs 25 are disposed between this spring receiving member 24 and the supporting member 16. The guide plate 20 is thus provided so as to be movable toward and away from the sprocket 1 (in a horizontal direction) and is constantly urged outward or in the direction opposite from the sprocket 1

In FIGS. 2 through 4, the reference numeral 26 is an attachment plate that attaches the guide plate 20 to the slide member 19, 27 is an attachment plate which attaches the spring receiving member 24 to the guide plate 20. The reference numeral 29 is a base.

Figure 5:
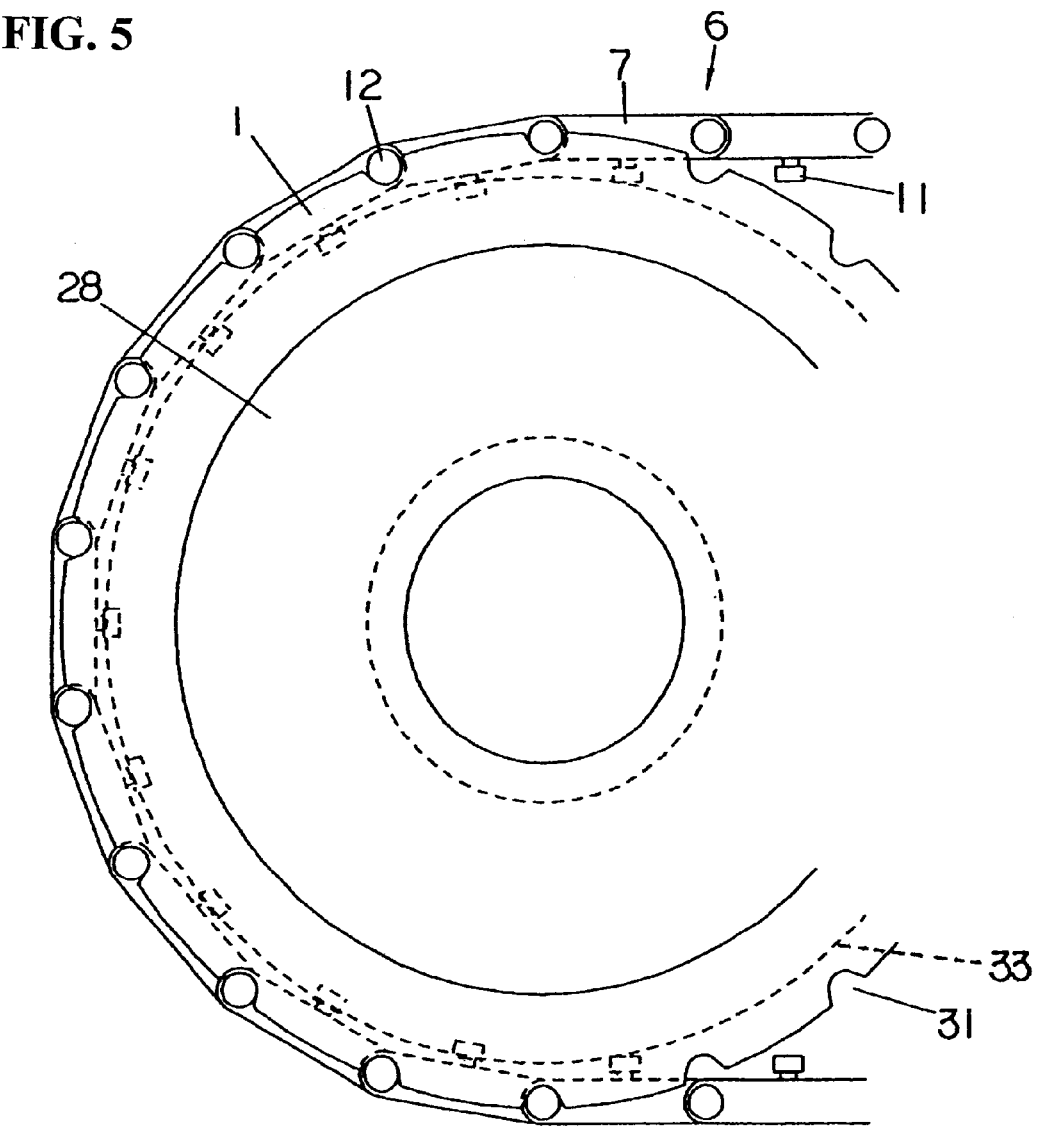
FIG. 5 is a top view of the sprocket.
Figure 6:
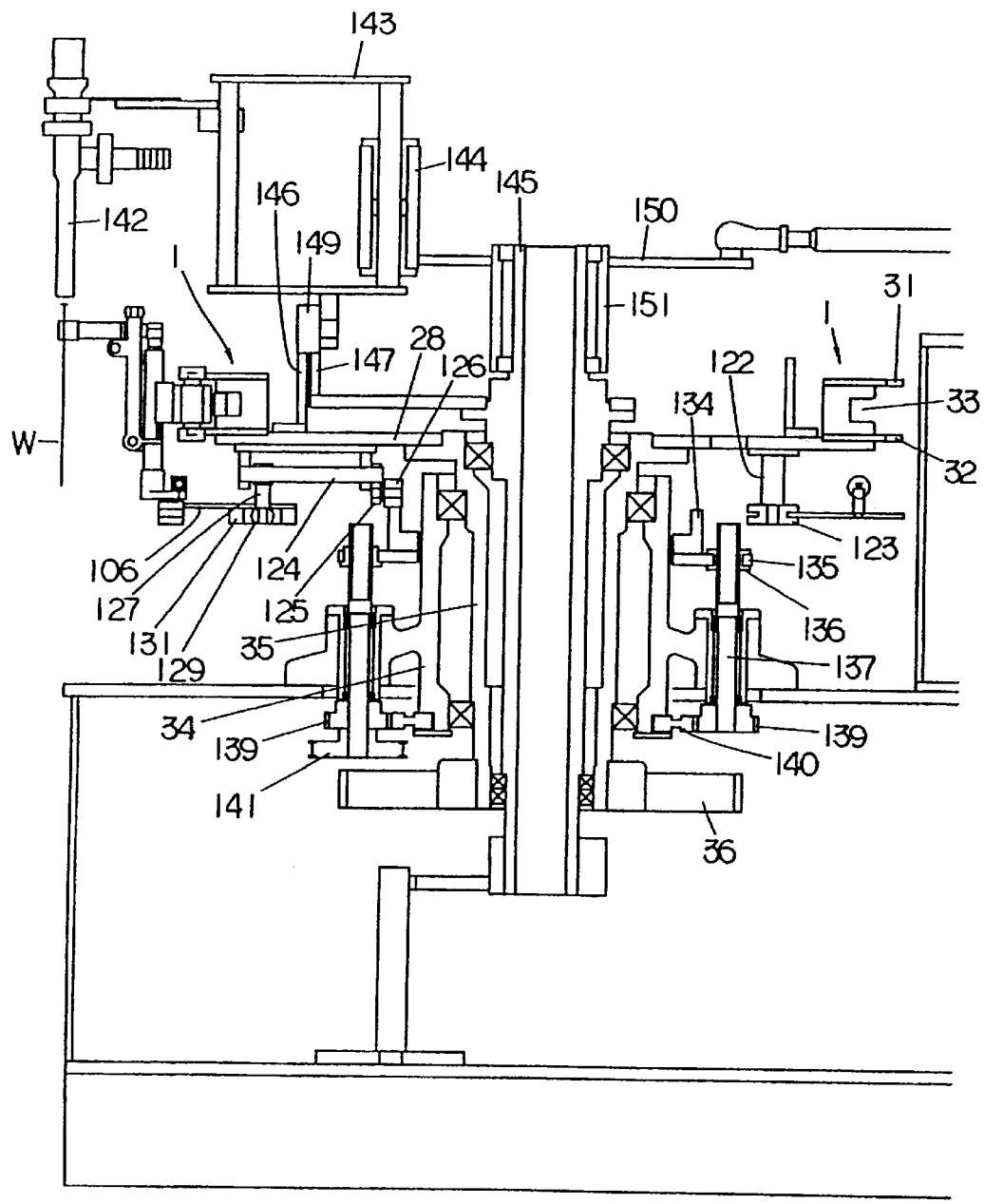
FIG. 6 is a sectional front view of the sprocket and its related elements.
Figure 9:
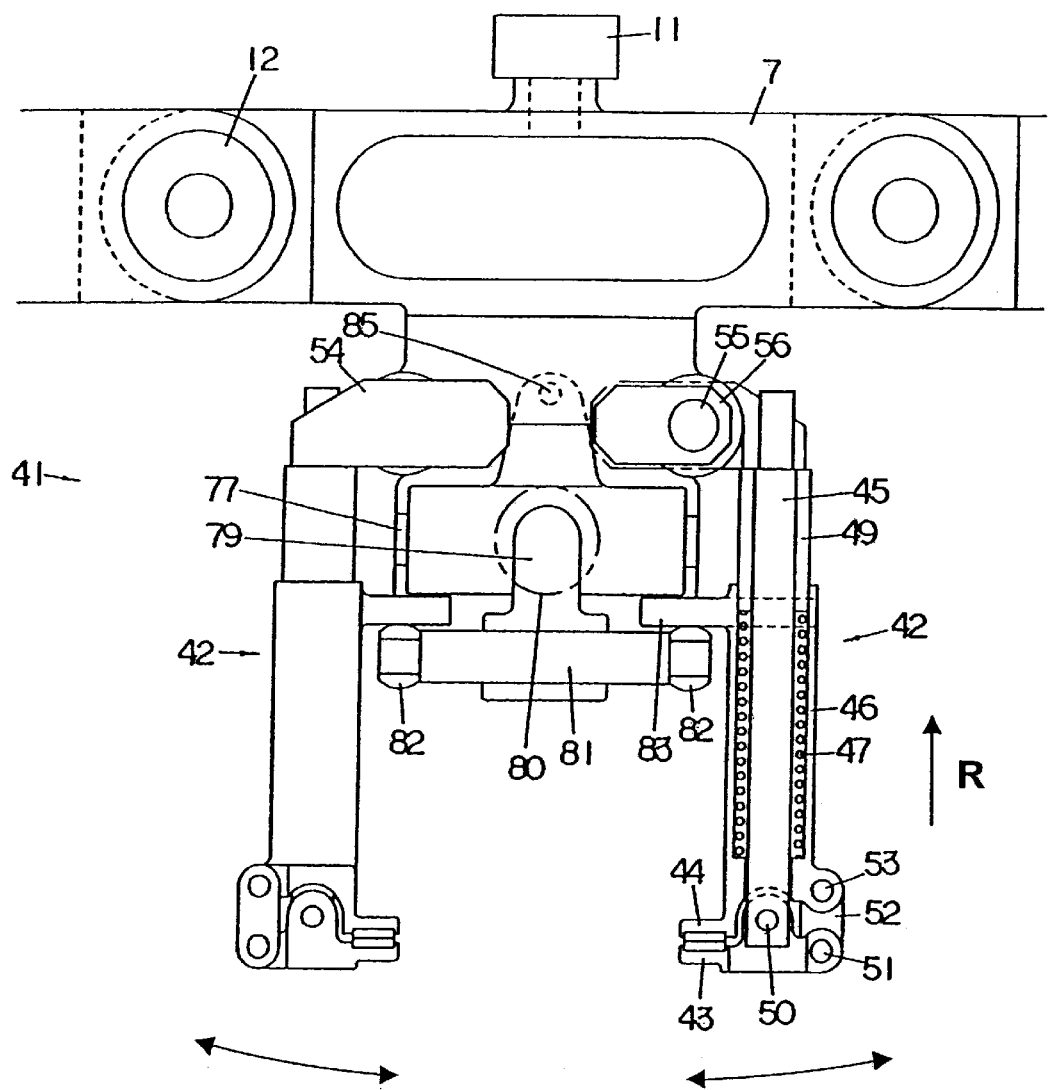
FIG. 9 is a top view (partially in section) of one of the gripper pairs.

As seen from FIGS. 5 and 6, the sprocket 1 is fastened to the circumference of a sprocket attachment plate 28.

The sprocket 1 has upper and lower recessed portions 31 and 32 that are formed at equal intervals in its outer circumferential surface. The upper and lower rollers 12 and 13 of the endless chain 6 respectively come into an engagement with the upper and lower recessed portions 31 and 32. Furthermore, the sprocket 1 has an annular supporting groove 33 into which the inside rollers 11 of the endless chain 6 are fitted.

The sprocket attachment plate 28 is fastened to the second hollow shaft 35. The second hollow shaft 35 is rotatably supported inside a stand 34 which is installed in an upright position on the base 29. To the lower end of the second hollow shaft 35, a gear 36 used for rotational driving which is connected to a driving source (not shown) is fastened.

Figure 10:
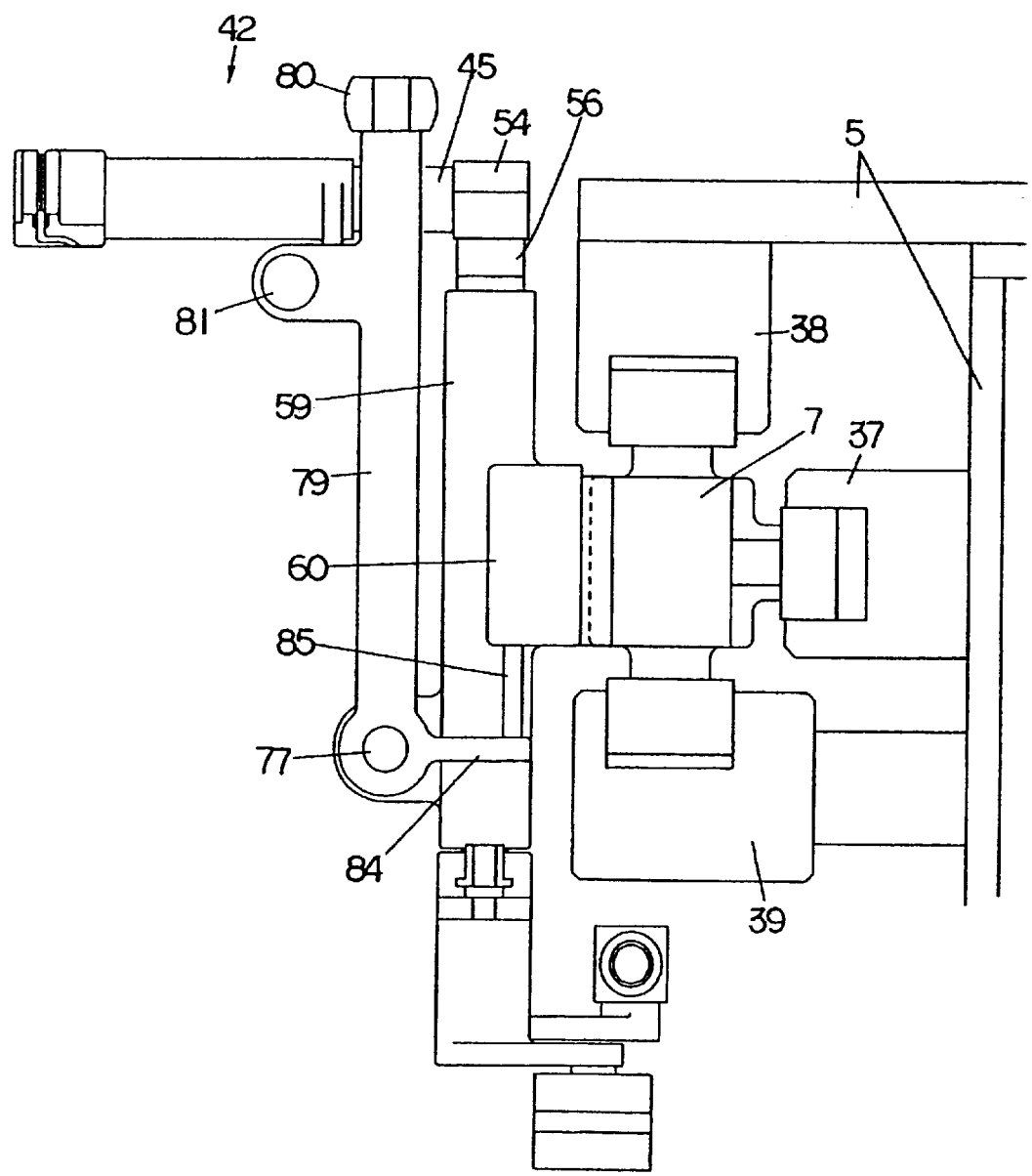
FIG. 10 is a side view (partially in section) of the gripper pairs.
Figure 11:
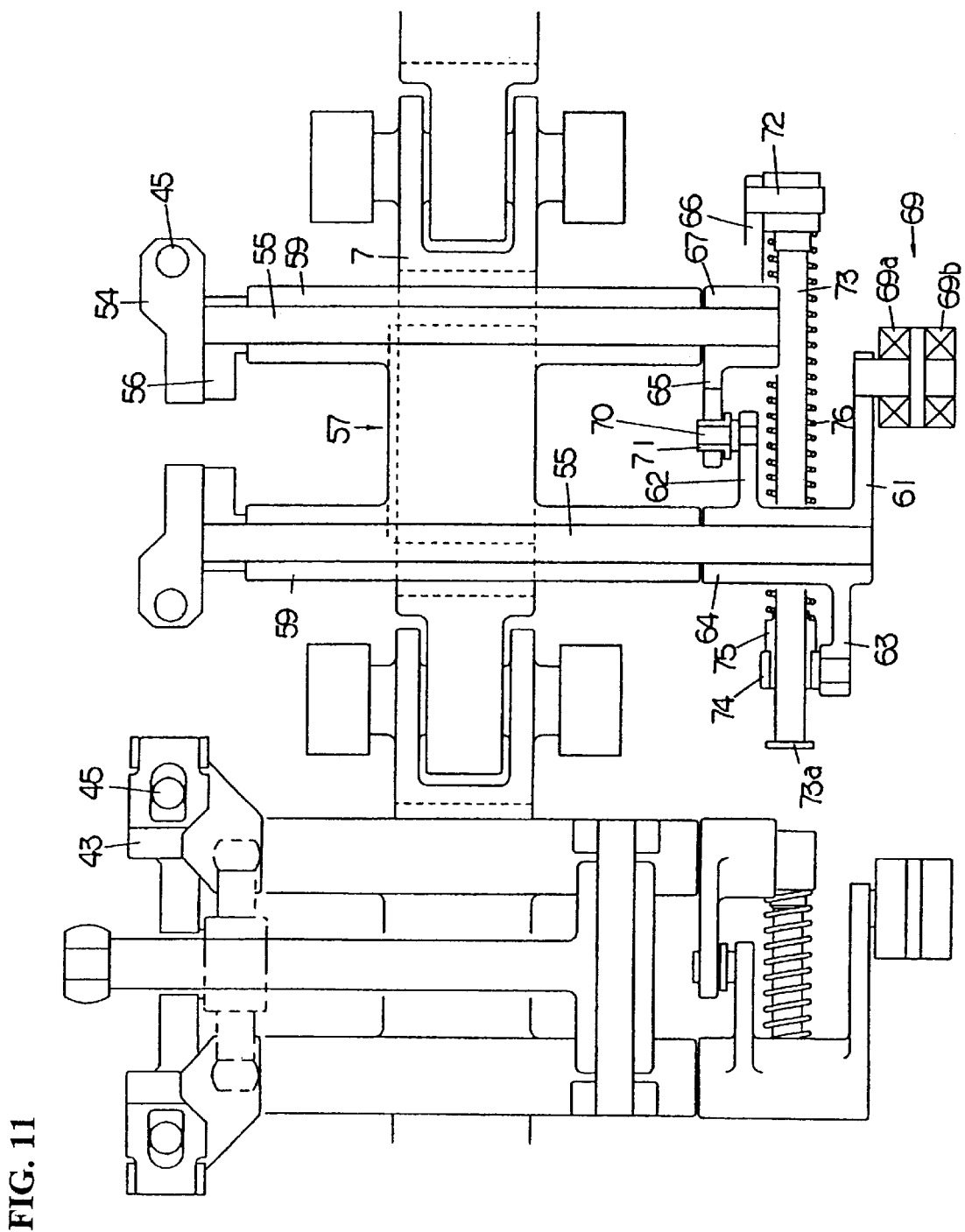
FIG. 11 is a front view (partially in section) of the gripper pairs.
Figure 12:
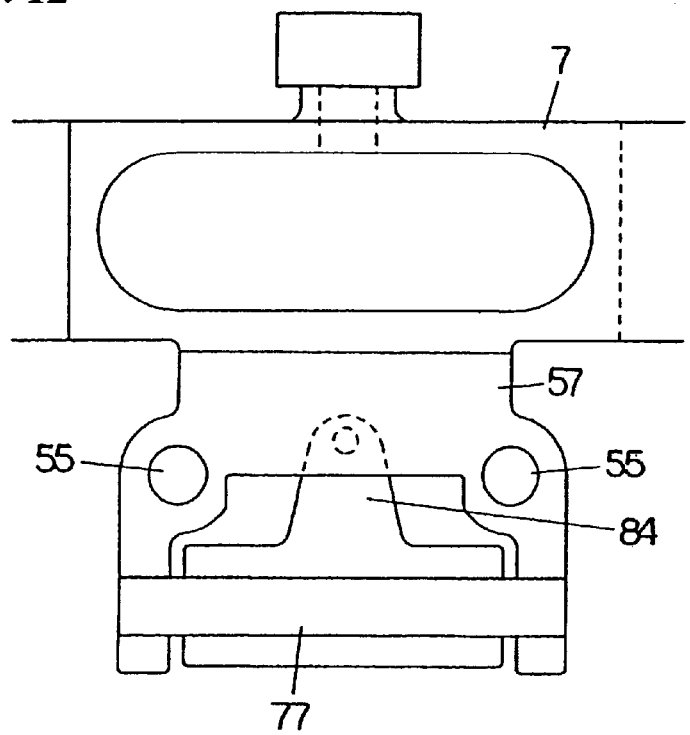
FIG. 12 is a sectional top view of the gripper pairs.
Figure 13:
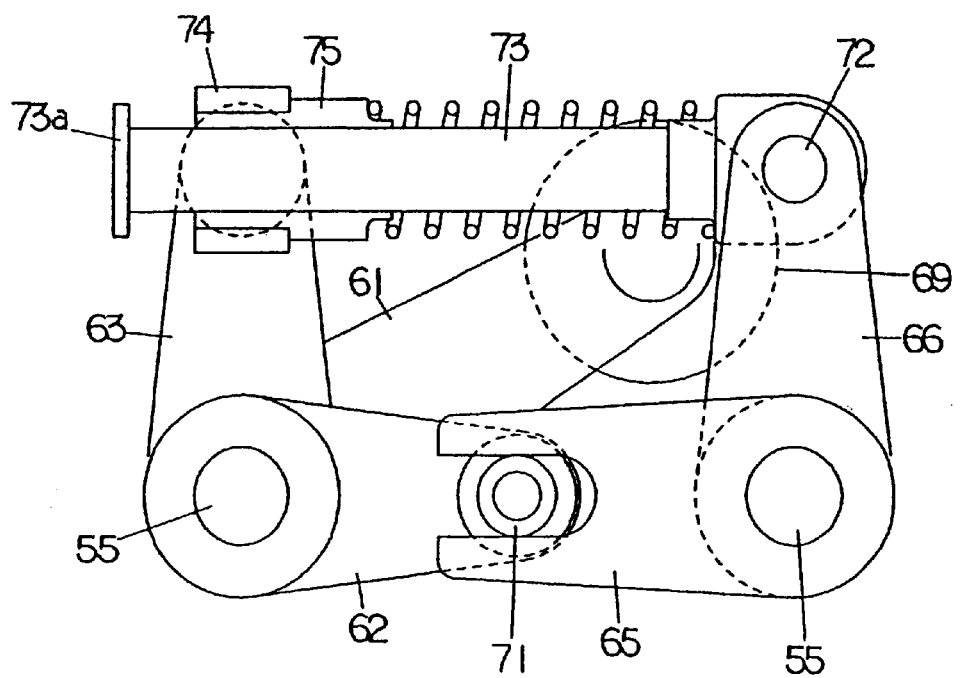
FIG. 13 is a sectional top view of the arm opening-and-closing mechanism.

Furthermore, as seen from FIGS. 1 and 10, the rectilinear guide members 4 each includes an inside guide rail 37, an upper guide rail 38 and a lower guide rail 39. Each of these rails 37, 38 and 39 is provided with a guide groove so that the respective guide rollers 11, 12 and 13 of the link 7 of the endless chain 6 is fitted in. The guide rails 4 are attached to the sub-base 5.

With the structure above, when the gear 36 is rotated, the sprocket 1 rotates; and the endless chain 6 is rotated together with the sprocket 1. In this case, the inside guide rollers 11 of the endless chain 6 are fitted in the supporting groove 33, and the upper and lower guide rollers 12 and 13 of the endless chain 6 are fitted in the recessed portions 31 and 32. As a result, the respective links 7 of the endless chain 6 are rotated with the links 7 being positioned on the circumference of the sprocket 1.

The guide rollers 11, 12 and 13 of the endless chain 6 that have left the sprocket 1 run while being fitted in the respective guide rails 37, 38 and 39 of one of the rectilinear guide members 4 and then enter the circular-arc-form guide section 2 of the fixed guide member 3.

In the guide section 2 of the fixed guide member 3, the inside guide rollers 11 run while being fitted in the guide groove 23, and the upper and lower guide rollers 12 and 13 run over the upper and lower roller guide sections 21 and 22. Since the guide section 2 is urged outward or in the direction opposite from the sprocket 1 by the compression springs 25, the upper and lower guide rollers 12 and 13 are kept in a tight contact with the roller guide sections 21 and 22.

The guide rollers 11 through 13 that have left the guide section 2 enter the other rectilinear guide members 4 and run toward the sprocket 1 while likewise being fitted in the guide rails 37 through 39.

In the above description, the sprocket is rotated continuously. However, in the present invention, the sprocket can be rotated intermittently.

As seen from the above, while running the track formed by the sprocket 1, rectilinear guide members 4 and the guide section 2, the guide rollers 11 through 13 of the endless chain 6 are securely guided by the recessed portions 31 and 32 and supporting groove 33 of the sprocket 1, the guide section 2 and the rectilinear guide sections 4.

Accordingly, the positions of the traveling links 7 in the vertical direction and horizontal direction are stable. Even if the weight of the filled bags and the impact during filling process are transmitted to the links 7 via the grippers (described later) provided on the endless chain 6, the links 7 are able to withstand these weights and impact, and the grippers (i.e., bags) can be conveyed along the conveying track t with good precision.

Each one of the links 7 of the endless chain 6 has a relatively large rectilinear length. Accordingly, the center length of the endless chain 6 (the length between the center of the sprocket 1 and the center of the circular arc of the guide section 2) would fluctuate during the running of one pitch (i.e., the length of one link 7) when the endless chain 6 is rotated. However, such a fluctuation is absorbed by the compression springs 25.

FIGS. 9 through 13 shows gripper pairs 41 that are attached to the outside surfaces of the respective links 7.

More specifically, each gripper pair 41 is equipped with a pair of arms 42 which extend horizontally outward and which open and close in the left-right direction at a specified timing. Gripping members 43 and 44 which open and close are attached to the tip end portions of these arms.

Each arm 42 is comprised of a fixed shaft 45, a sliding tube 46 which is fitted over the circumference of the fixed shaft 45, a compression spring 47 which drives the sliding tube 46 forward (in the direction that closes the gripping members 43 and 44), and a receiving seat 49 which is fitted over the fixed shaft 45.

The intermediate portion of the outside gripping member 43 is rotatably shaft-supported on the tip end of the fixed shaft 45 by a pin 50. The rear end portion of the outside gripping member 43 is shaft-supported on the outside tip end of the sliding tube 46 via a connecting pin 51, link 52 and connecting pin 53 so that the gripping member 43 pivots in the horizontal direction. Accordingly, when the sliding tube 46 is retracted in the direction of arrow R in FIG. 9 against the driving force of the compression spring 47, the gripping members 43 and 44 open widely (see FIG. 16).

The rear end of each fixed shaft 45 is fastened to an attachment block 54, and this attachment block 54 is fastened to the upper surface of an attachment block 56 which is fastened to the tip end of a swinging supporting shaft 55 that extends in the vertical direction. Accordingly, when the swinging supporting shafts 55 are rotated about their axes, the pair of arms 42 swing to the left and right (i.e., open and close) together with the attachment blocks 54 and 56 as shown by curved arrows in FIG. 9.

The swinging supporting shafts 55 are rotatably supported inside the tubular elements 59 of a holder 57, and the holder 57 is fastened to the outside surface of the corresponding link 7 in an attachment element 60.

A tubular member 64 to which three levers 61, 62 and 63 are attached is fastened to the lower end of one swinging supporting shaft 55 of each pair. A tubular member 67 to which two levers 65 and 66 are attached is fastened to the lower end of the other swinging supporting shaft 55.

A two-stage cam roller 69 (including upper and lower stages) is rotatably supported on the tip end of the lever 61. This cam roller 69 runs along a spacing adjustment cam (described later) and causes the first swinging supporting shaft 55 to rotate.

Furthermore, a bush 71 is rotatably attached to the tip end of the lever 62 via a supporting pin 70. The bush 71 fits in a groove-form cutout formed in the lever 65. As a result, the other swinging supporting shaft 55 also simultaneously rotates in the opposite direction.

Furthermore, a connecting shaft 73 is attached to a supporting pin 72 on the tip end of the lever 66 so that the connecting shaft 73 is rotated in the horizontal direction. A bush 75 is horizontally fastened to a holder pin 74 which is rotatably attached to the tip end of the lever 63, and the connecting shaft 73 is slidably fitted in the bush 75. A compression spring 76 is disposed around the circumference of the connecting shaft 73. The compression spring 76 presses the cam roller 69 against the spacing adjustment cam. The reference numeral 73a (see FIG. 13) is a stopper.

A supporting shaft 77 is rotatably supported on the outermost portion of the holder 57, and the lower end of an opening-and-closing lever 79 is fastened to this supporting shaft 77. An opening-and-closing roller 80 is rotatably disposed on the upper end of the opening-and-closing lever 79, and this opening-and-closing roller 80 is pressed inward at a specified timing by the pressing portion of an opening-and-closing member (described later).

A supporting shaft 81 is horizontally fastened to the opening-and-closing lever 79 in a slightly lower position, and pressing rollers 82 are rotatably attached to both ends of this supporting shaft 81. The pressing rollers 82 respectively contact operating members 83 on the outer circumferences of the sliding tubes 46. When the opening-and-closing roller 80 is pushed inward, the pressing rollers 82 push the operating members 83 inward, so that the gripping members 43 and 44 open against the driving force of the compression springs 47.

The opening-and-closing lever 79 is urged by the compression springs 47 in a direction which causes the opening-and-closing lever 79 to be pushed over in an outward direction. However, a contact section 84 on the lower end of the opening-and-closing 79 contacts a stopper pin 85 which is installed facing downward on the attachment element 60 of the holder. Thus, the opening-and-closing lever 79 is not pushed over any further than this point.

Next, the opening and closing operation of the gripping members 43 and 44 will be described.

Figure 14:
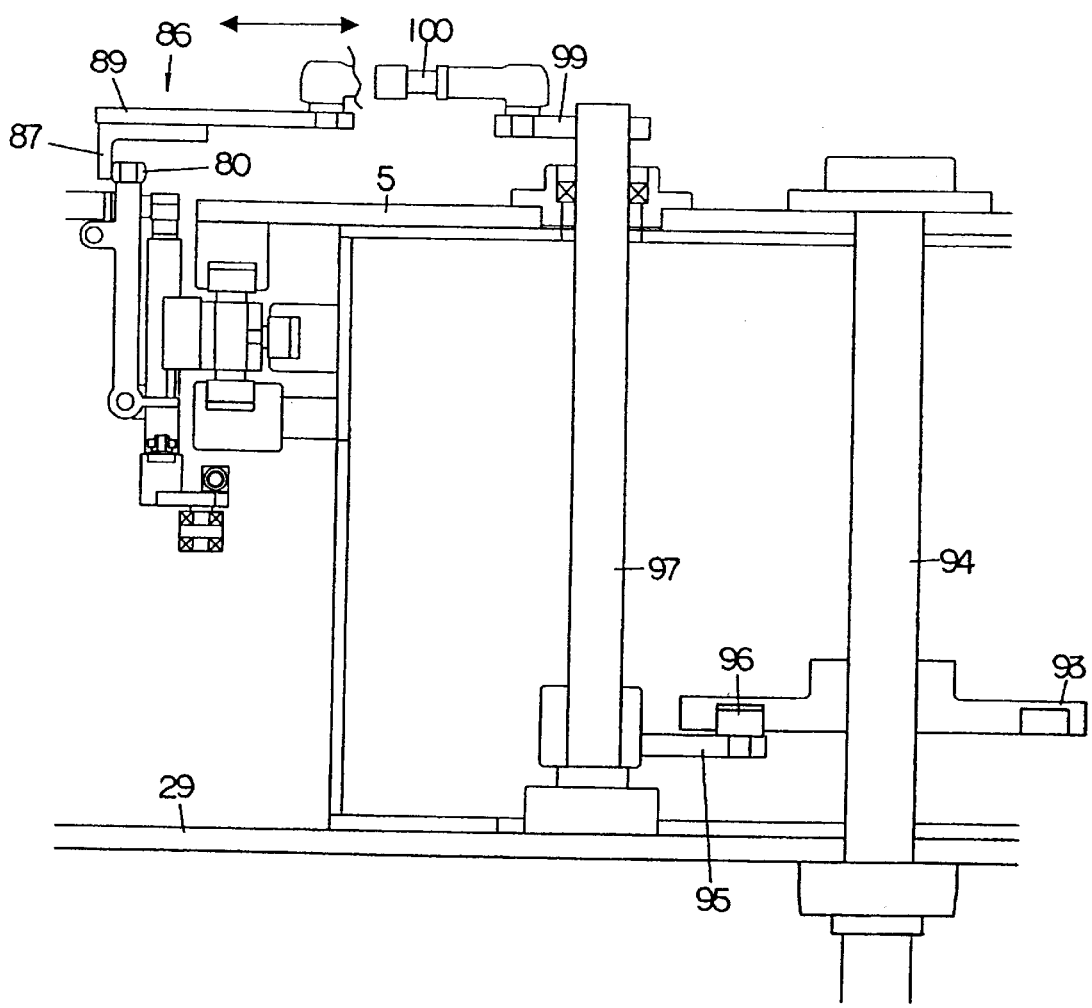
FIG. 14 is a sectional side view of the opening-and-closing mechanism for the gripping members of one of the gripper pairs.
Figure 15:
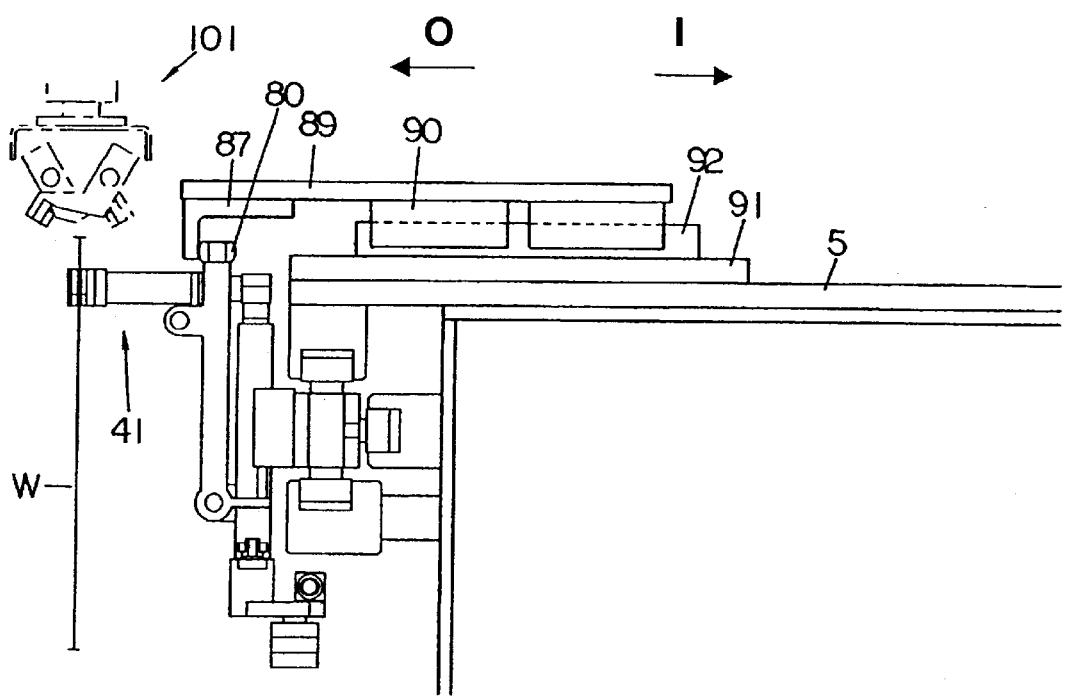
FIG. 15 is a sectional side view of another position of the opening-and-closing mechanism for the gripping members.
Figure 16:
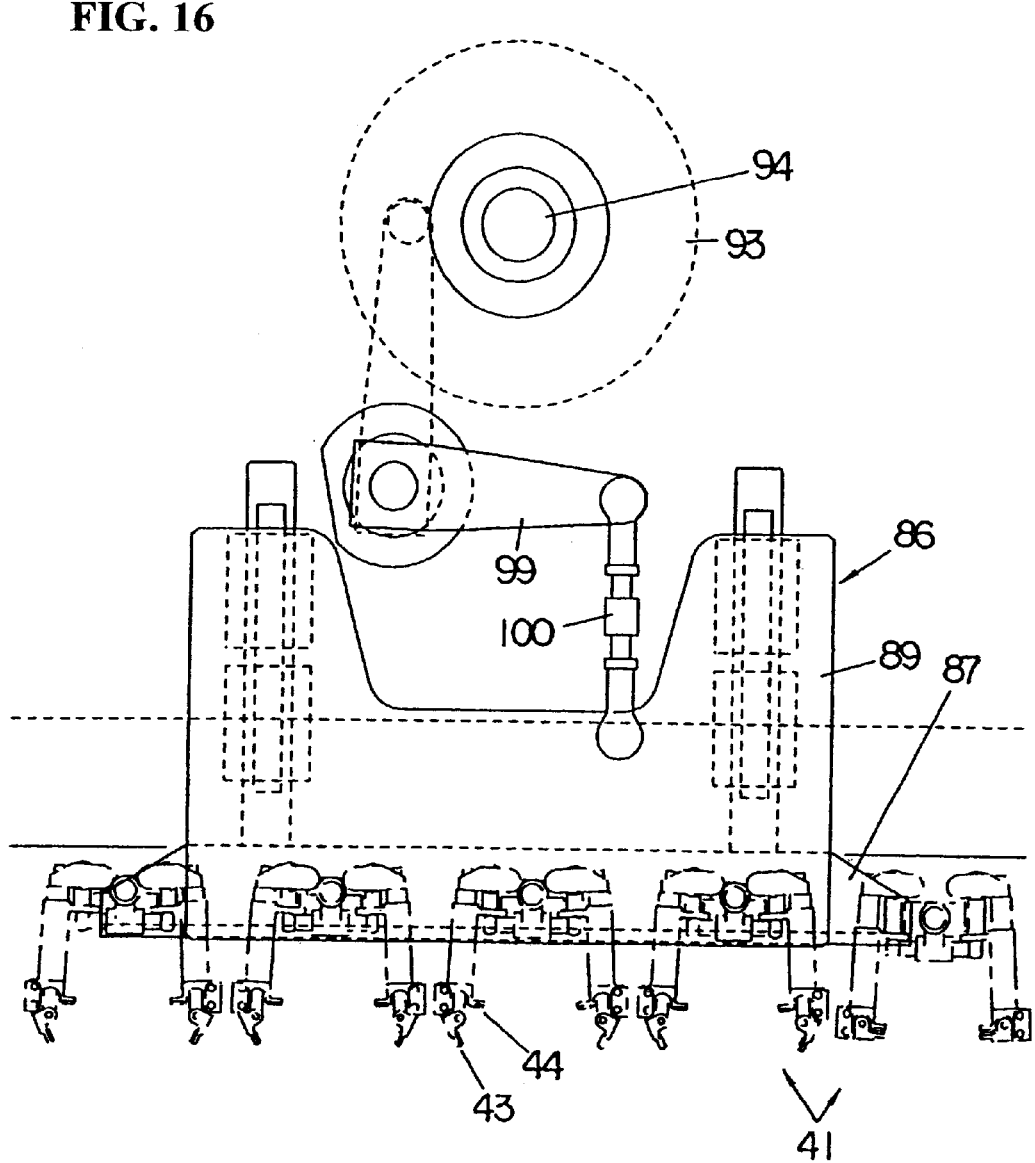
FIG. 16 is a top view thereof.

As seen from FIGS. 14 through 16, an opening-and-closing member 86 which operates the opening-and-closing rollers 80 is disposed on the sub-base 5 in the bag supplying process section of the bag filling packaging machine. The opening-and-closing member 86 is comprised of an opening-and-closing plate 89 and a pressing portion 87 and. The pressing portion 87 presses against the opening-and-closing rollers 80, and this pressing portion 87 is attached to the opening-and-closing plate 89. Slide members 90 are attached to the undersurface of the opening-and-closing plate 89. The slide members 90 are disposed so as to slide along a slide rail 92 which is fastened to an attachment plate 91 on the upper surface of the sub-base 5.

Furthermore, a cam driving shaft 94 to which a cam 93 is attached is installed in an upright position on the base 29, and a cam roller 96 on the tip end of a lever 95 is inserted into the cam groove of the cam 93. The lever 95 is fastened to a point near the lower end of a supporting shaft 97 which is rotatably installed in an upright position on the base 29. A lever 99 is fastened to the upper end of the supporting shaft 97, which protrudes from the sub-base 95; and the lever 99 is connected to the opening-and-closing plate 89 via a connecting rod 100.

The cam driving shaft 94 is rotated, and the opening-and-closing plate 89 makes a reciprocating motion (as shown by arrow in FIG. 14) at a specified timing. At the same timing as the timing at which a plurality of bag supplying conveying devices 101 (four bag supplying conveying devices 101 in this case) approach while respectively gripping the upper edges of bags W, the pressing portion 87 is moved inward (as shown by arrow I in FIG. 15) and presses against the opening-and-closing rollers 80, so that the gripping members 43 and 44 of a plurality of gripper pairs 41 (similarly, four gripper pairs 41 in this case) simultaneously open. Then, while the bag supplying conveying devices 101 is moved in synchronization with the conveying movement of the gripper pairs 41, the pressing portion 87 is moved outward (as shown by arrow O), so that the gripping members 43 and 44 of the respective gripper pairs 41 close and grip the bags W. At the same time, the grippers of the bag supplying conveying devices 101 release the bags W and moved away from the vicinity of the gripper pairs 41. In this way, the supplying of bags is accomplished.

A device similar to the opening-and-closing member 86 and driving mechanism of the same is disposed in the discharge process section (not shown) of this bag filling packaging machine, wherein the device opens the gripping members 43 and 44 of the gripper pairs 41 so that the filled bags are dropped and discharged.

Next, the opening and closing operation of the arms 42 will be described.

Figure 17:
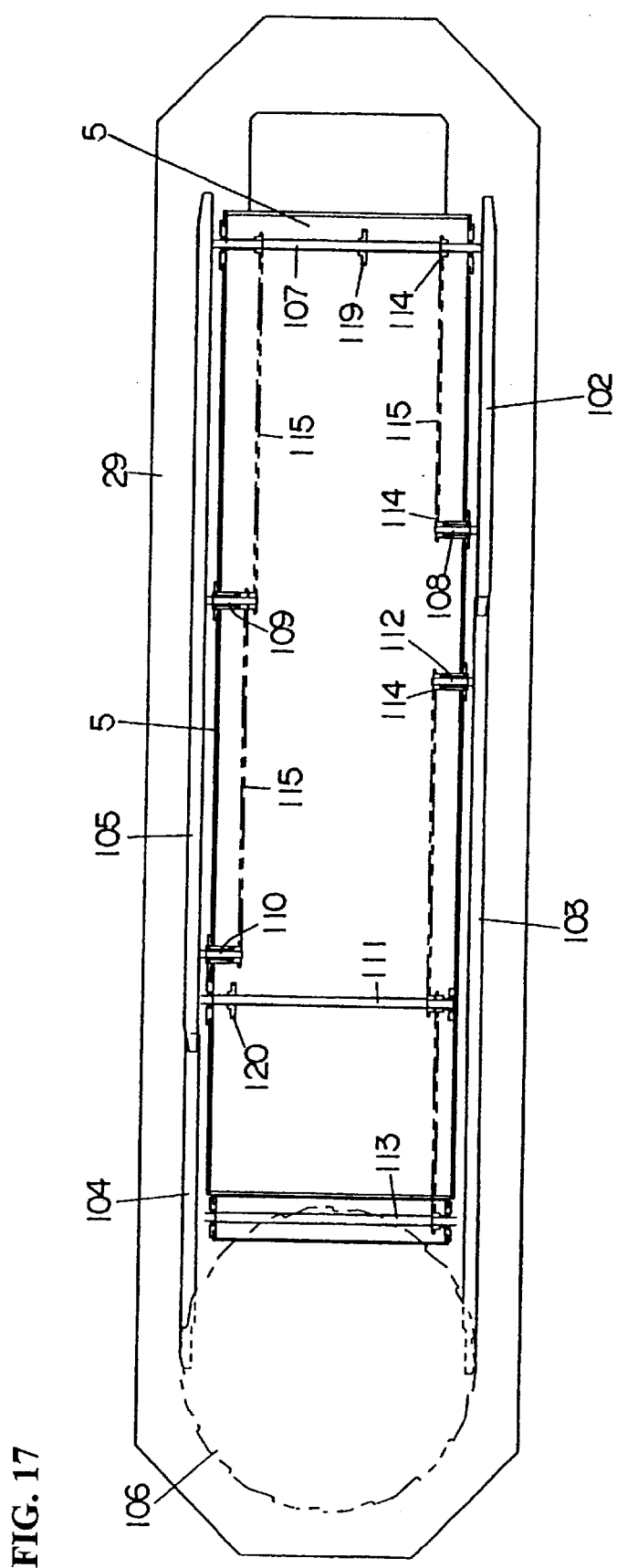
FIG. 17 is a sectional top view of the arm opening-and-closing and arm spacing adjustment mechanism of one of the gripper pairs.
Figure 18:
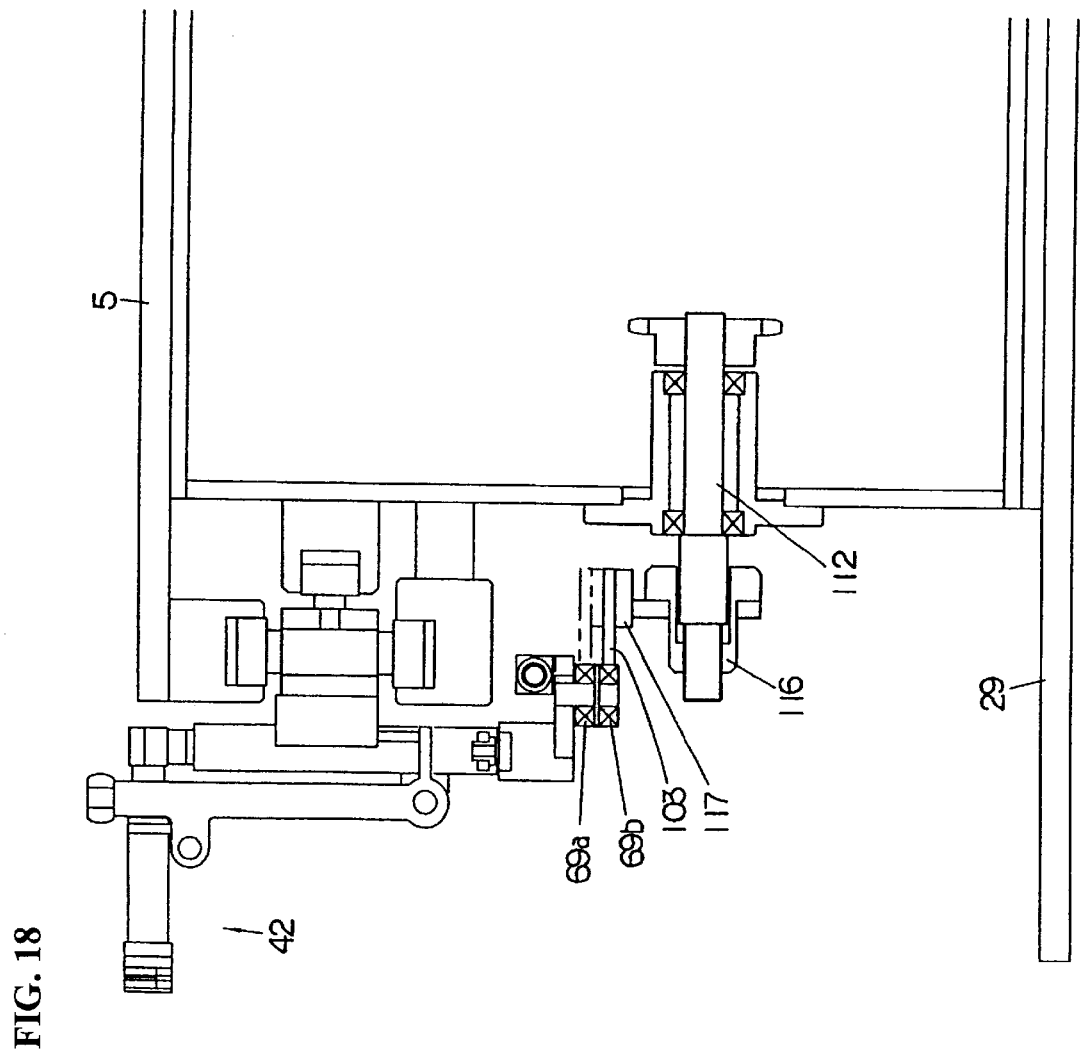
FIG. 18 is a sectional side view of the rectilinear section of the bag conveying apparatus.

As shown in FIGS. 17 and 18, four spacing adjustment cams 102, 103, 104 and 105 which adjust the spacing of the arms 42 (i.e., opening and closing of the arms 42) by contacting the cam rollers 69 are disposed along the rectilinear track so as to correspond to the respective packaging treatment processes. Also, a spacing adjustment cam 106 which rotates together with the sprocket 1 is disposed at the position of the sprocket 1.

The spacing adjustment cam 102 is positioned in the bag supplying process section, and the spacing adjustment cam 103 is positioned in the bag mouth opening and solid matter filling process section where the spacing of the arms 42 is narrowed. The location of the spacing adjustment cam 106 is for the liquid matter filling process section, and the spacing adjustment cam 104 is positioned in the steam injection process section. The spacing adjustment cam 105 that follows the spacing adjustment cam 104 is positioned in the sealing and discharge process section. The spacing of the arms 42 is again widened in this sealing and discharge process section.

The respective spacing adjustment cams 102 through 106 are set at respective heights. In other words, the spacing adjustment cams 102, 106 and 105 are set so as to contact the upper rollers 69a of the cam rollers 69; and the spacing adjustment cams 103 and 104 are set so as to contact the lower rollers 69b.

The respective spacing adjustment cams 102 through 105 are arranged so that the spacing of the arms 42 is adjusted in accordance with the bag size and at the same time so that the opening and closing operation of the arms 42 is performed.

The adjustment mechanisms of the spacing adjustment cams 102 and 105 includes an adjustment driving shaft 107 which is shaft-supported on the side surfaces of the sub-base 5, and it further includes adjustment shafts 108, 109 and 110, etc. which are shaft-supported on the side surfaces of the sub-base 5 and connected to the adjustment driving shaft 107 via sprockets 114 and chains 115.

The adjustment mechanisms of the spacing adjustment cams 103 and 104 likewise includes an adjustment driving shaft 111, and it further includes adjustment shafts 112 and 113, etc., which are connected to this adjustment driving shaft 111 by sprockets 114 and chains 115.

Externally threaded screws are formed on the tip ends of the respective adjustment driving shafts and adjustment shafts 107 through 113, and nut members 116 are screwed onto these externally threaded screws. The spacing adjustment cams 102 through 105 are attached to the nut members 116 via brackets 117 (see FIG. 18).

Accordingly, when gears 119 and 120 are rotated as a result of being respectively driven by servo motors, etc. (not shown), the respective adjustment driving shafts and adjustment shafts 107 through 113 are rotated, and the respective spacing adjustment cams 102 through 105 are moved in a parallel motion. The spacing of the arms 42 is thus adjusted to positions that correspond to the bag size.

The spacing adjustment cam 106 is also arranged so that the spacing of the arms 42 can be adjusted in accordance with the bag size.

Figure 19:
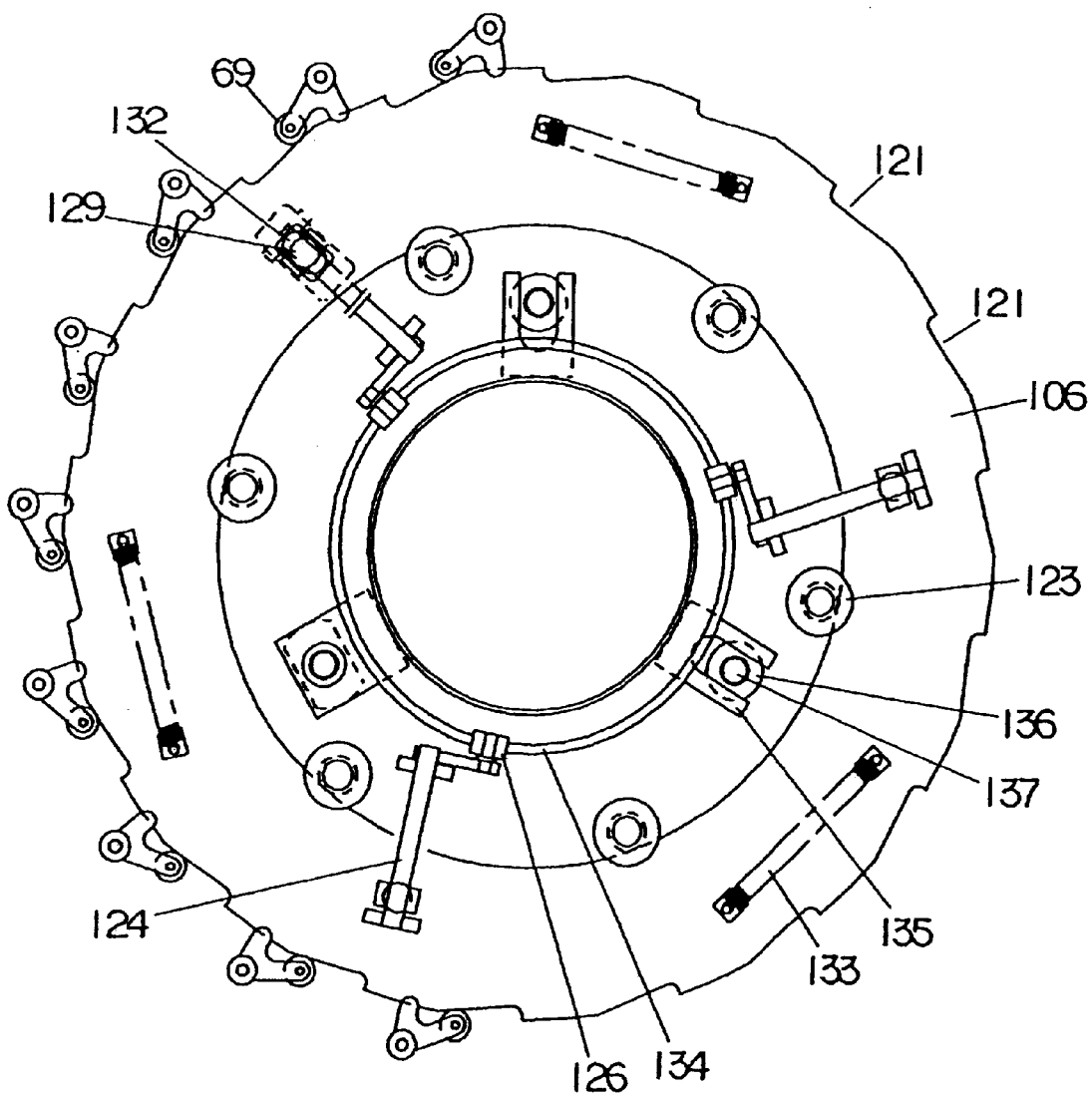
FIG. 19 is a sectional top view of the sprocket section.

More specifically, as shown in FIG. 19, inclined cam contact surfaces 121 which correspond to the respective cam rollers 69 (69a) are formed on the outer circumference of the spacing adjustment cam 106. The spacing adjustment cam 106 is arranged so as to be rotated relative to the sprocket attachment plate 28 (i.e., relative to the sprocket 1).

Accordingly, by way of causing the spacing adjustment cam 106 to rotate relative to the sprocket 1, the positions of the cam rollers 69 (69a) that contact the cam contact surfaces 121 (i.e., the distances of the cam rollers 69 from the center of rotation of the sprocket 1) are changed, and the spacing of the arms 42 is adjusted accordingly.

Figure 20:
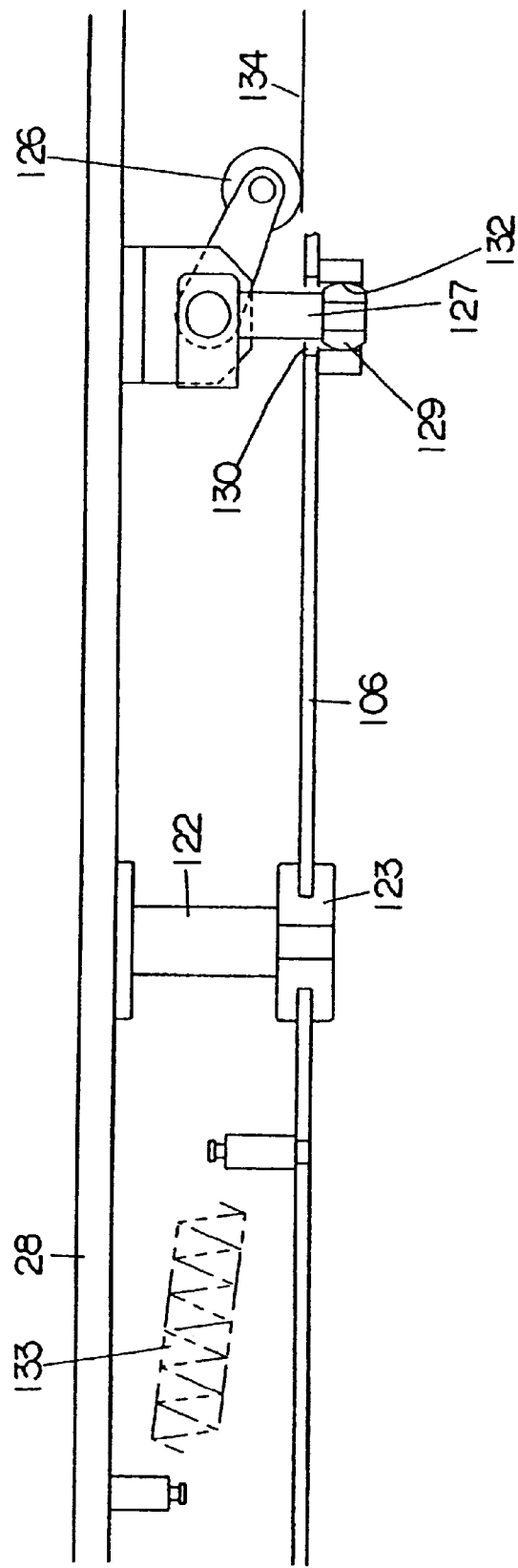
FIG. 20 is a sectional side view of a part of the sprocket section.

This arm spacing adjustment mechanism will be described more concretely with reference to FIGS. 6 and 20.

The spacing adjustment cam 106 is an annular-shape member, and the inner circumferential side of this cam 106 engages with the outer circumferential grooves of holders 123. The holders 123 are attached to the lower ends of supporting stands 122 that are disposed at equal intervals on the lower portion of the sprocket attachment plate 28. Thus, the spacing adjustment cam 106 is rotated relative to the sprocket attachment plate 28.

Furthermore, adjustment shafts 124 are shaft-supported in a rotatable fashion on the lower portion of the sprocket attachment plate 28, and cam rollers 126 are attached to the inside ends of the adjustment shafts 124 via levers 125. Rollers 129 are attached to points near the outside ends of the adjustment shafts 124 via levers 127. The rollers 129 pass through holes 130 formed in the spacing adjustment cam 106 and are fitted inside the slots 132 of contact members 131 that is attached to the underside of the spacing adjustment cam 106.

Tension springs 133 are disposed between the cam attachment plate 28 and the spacing adjustment cam 106 via spring hooks. The springs 133 impart a rotational force to the spacing adjustment cam 106, thus driving the spacing adjustment cam 106 so that the cam rollers 126 constantly contact the upper surface of a cylindrical cam 134.

The cylindrical cam 134 is fastened to a plurality of supporting members 135 (three supporting members 135 in this example) which are disposed around the circumference of the stand 34, and these supporting members 135 are fastened to respective nut members 136.

Meanwhile, the same number (as that of the supporting members 135) of rotating shafts 137 are shaft-supported on the base 29 in a rotatable fashion around the circumference of the stand 34, and externally threaded screws formed on the tip ends of these rotating shafts 137 are respectively screwed into the nut members 136. Furthermore, respective small-diameter gears 139 are fastened to the lower ends of the rotating shafts 137, and these gears engage with a common large-diameter gear 140 which is rotatably held on the circumference of the stand 34. For one rotating shaft 137, a pulley 141 is fastened beneath the small-diameter gear 139.

Accordingly, when the pulley 141 is rotated as a result of being driven by a servo motor, etc. (not shown), all of the rotating shafts 137 are rotated simultaneously, so that the cylindrical cam 134 varies its height while maintaining the horizontal attitude.

As a result, the heights of the cam rollers 126 are changed, the adjustment shafts 124 are rotated, and the rollers 129 swing and the spacing adjustment cam 106 are rotated. Thus, the position of the spacing adjustment cam 106 relative to the sprocket 1 is changed. Consequently, the positions of the cam rollers 69 (69a) (i.e., the distances of the cam rollers 69 from the center of rotation of the sprocket 1) are changed, and the spacing of the arms 42 is adjusted.

Furthermore, as seen from FIG. 6, filling nozzles 142 (a plurality of filling nozzles 142) for liquid matter are disposed above the sprocket 1 along the conveying track t of the bags W. These filling nozzles 142 are attached to raising-and-lowering members 143.

The raising-and-lowering members 143 follow the sprocket 1 so that it is rotated by a specified angle in the same direction as the sprocket 1. During this movement, the raising-and-lowering members 143 make a reciprocating pivoting motion in which the raising-and-lowering members 143 are lowered and raised and then returned to their original positions. When the raising-and-lowering members 143 are lowered, the filling nozzles 142 are inserted into the opened mouths of the bags W, and the bags W are filled with liquid matter.

The raising-and-lowering and pivoting mechanisms of the raising-and-lowering members 143 comprises, among others (not shown) a supporting member 144, a first hollow shaft 145, a tubular cam 146, a circular-arc-form cam 147, a cam roller 149, a lever 150, and a rotating tube 151.

The supporting member 144 supports each raising-and-lowering member 143 so that the raising-and-lowering member 143 are raised and lowered. The first hollow shaft 145 makes a reciprocating pivoting motion through a specified angle at a specified timing. The tubular cam 146 is fastened to the surface of the sprocket attachment plate 28, and the circular-arc-form cam 147 is fastened to the first hollow shaft 145. The cam roller 149 runs along these cams 146 and 147, and the lever 150 causes the supporting member 144 to make a reciprocating pivoting motion. The rotating tube 151 supports the lever 150 on the circumference of the first hollow shaft 145 so that the lever 150 is rotated.

A detailed description of the raising-and-lowering and pivoting mechanisms of the raising-and-lowering members 143, the elements thereof and the function thereof will be omitted herein.

Figure 21:
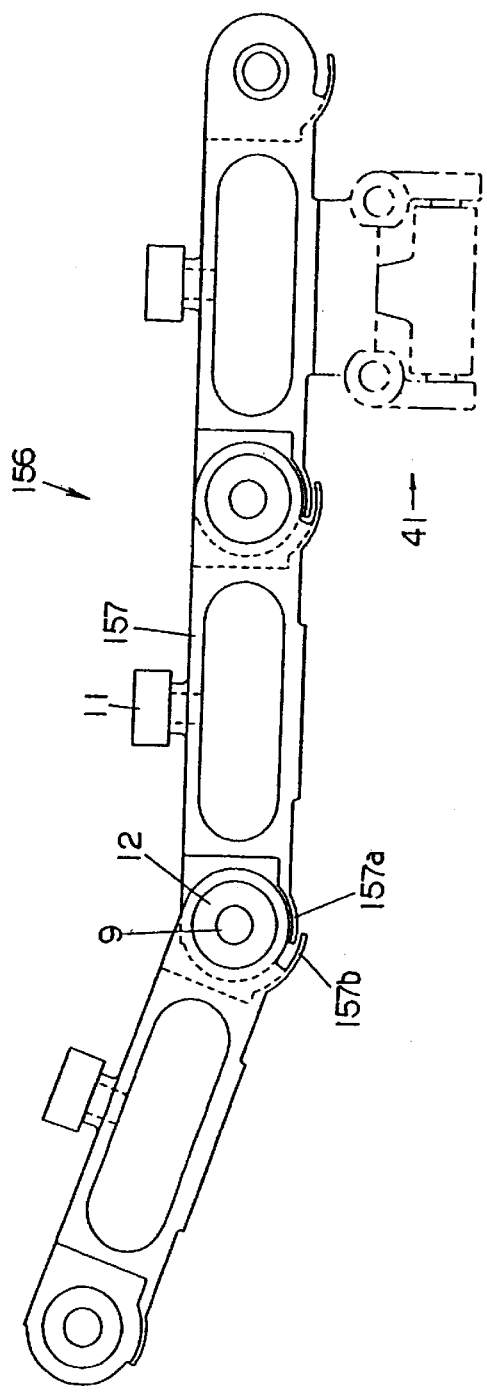
FIG. 21 is a top view of another type of the endless chain.
Figure 22:
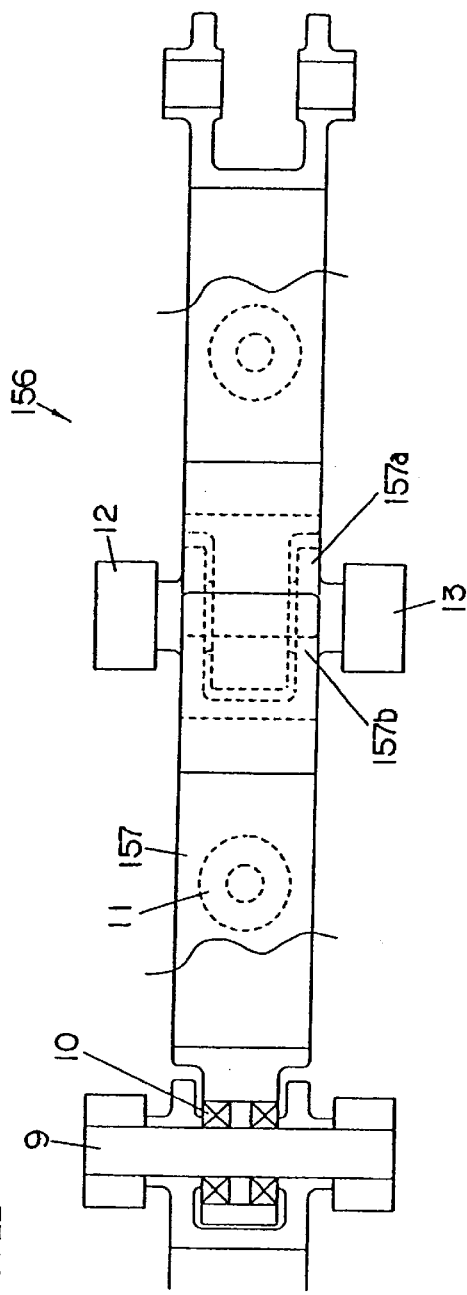
FIG. 22 is a front view (partially in section) thereof.

FIGS. 21 and 22 show another type of endless chain 156 used in the present invention.

The endless chain 156 differs from the endless chain 6 described in FIGS. 7 and 8. The difference is that covering portions 157a and 157b are formed on the left and right surfaces or the horizontal end surfaces of the outer circumferential side of each link 157. The covering portions 157a and 157b are in a circular arc shape when viewed from above, and they cover the connecting portions of the links. One covering portion 157a is formed with a smaller diameter than the other covering portion 157b, so that the smaller covering portion 157a fits in the larger covering portions 157b in the form of an insert.

With these covering portions 157a and 157b, the outside surfaces of the connecting portions are covered thereby and not exposed even if the endless chain 156 is bent into a circular arc shape in the areas of the sprocket 1 and guide section 2. As a result, dirt, etc., from the outside can be prevented from entering the connecting portions of the endless chain 156.

As seen from the above, according to the present invention, it is possible to simplify and lower the cost of a bag conveying apparatus and also to reduce the size of a bag filling packaging machine. Furthermore, the present invention provides a bag conveying apparatus for packaging treatment machines in which the gripper pairs are operated stably and with good precision over a long period of time.

What is claimed is:

1. A bag conveying apparatus used in a bag filling packaging machine, said bag conveying apparatus comprising:
    a sprocket driven so as to be rotated on a horizontal plane,
    a fixed guide member which has a guide section that has a substantially semicircular shape when viewed from above, said fixed guide member being disposed on substantially the same horizontal plane as said sprocket with a specified spacing in between,
    an endless chain provided between said sprocket and said guide section, and
    a plurality of gripper pairs installed at equal intervals on said endless chain, said plurality of gripper pairs being for griping both edges of a bag.

2. The bag conveying apparatus according to claim 1, wherein
    said endless chain is comprised of a plurality of links that are connected via connecting shafts,
    guide rollers which are rotatable about vertical axes thereof are disposed on each one of said connecting shafts,
    an inside guide roller which is rotatable about a horizontal axis thereof is disposed on an inner side of each of said links, and
    said guide section of said fixed guide member is provided with a roller guide section and a guide groove, said guide rollers contacting said roller guide and said inside guide roller fitting in said guide groove.

3. The bag conveying apparatus according to claim 2, wherein
    said sprocket is provided on an outer circumferential surface thereof with recessed portions at equal intervals so that said guide rollers of said endless chain engages with said recessed portions, and
    said sprocket is further provided with a supporting groove so that said inside guide roller of said endless chain fits in said supporting groove.

4. The bag conveying apparatus according to claim 2 or 3, wherein said guide rollers are disposed respectively on and under each one of said connecting shafts.

5. The bag conveying apparatus according to claim 1, 2 or 3, wherein
    said sprocket is provided at a predetermined position, and
    said guide section is provided so as to be movable toward and away from said sprocket and is constantly urged in a direction opposite from said sprocket.

6. The bag conveying apparatus according to claim 4, wherein
    said sprocket is provided at a predetermined position, and
    said guide section is provided so as to be movable toward and away from said sprocket and is constantly urged in a direction opposite from said sprocket.

7. A gripper endless chain comprising a plurality of links, which are connected via connecting shafts in an endless configuration, and a plurality of gripper pairs, which are for gripping both edges of a bag and disposed at equal intervals, wherein
    upper and lower rollers are disposed respectively on and under each one of said connecting shafts, each of said rollers being rotatable about an vertical axis thereof; and
    an inside roller is disposed on an inner side of each one of said links, said inside roller being rotatable about an horizontal axis thereof.

8. The gripper endless chain according to claim 7, wherein at least one of said plurality of gripper pairs is provided on each one of said links.

9. The gripper endless chain according to claim 7 or 8, wherein each one of said links is provided with covering portions on both ends of an outer circumferential side thereof so as to cover connecting portions of each one of said links.

* * * * *